(12) United States Patent
Khan et al.

(10) Patent No.: US 10,129,011 B2
(45) Date of Patent: Nov. 13, 2018

(54) SYSTEM AND METHOD FOR REDUCING FALSE PREAMBLE DETECTION IN A COMMUNICATION RECEIVER

(71) Applicant: Analog Devices Global, Hamilton (BM)

(72) Inventors: Muhammad Kalimuddin Khan, Rochestown (IE); Kenneth J. Mulvaney, Coolaney (IE); Philip P. E. Quinlan, Glounthaune (IE); Shane O'Mahony, Grenagh (IE)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 15/605,082

(22) Filed: May 25, 2017

(65) Prior Publication Data

US 2017/0264422 A1  Sep. 14, 2017

Related U.S. Application Data

(63) Continuation of application No. 15/045,826, filed on Feb. 17, 2016, now Pat. No. 9,673,962.

(51) Int. Cl.
| | | |
|---|---|---|
| *H04L 7/00* | (2006.01) | |
| *H04L 7/033* | (2006.01) | |
| *H04L 7/04* | (2006.01) | |

(52) U.S. Cl.
CPC ............ *H04L 7/0008* (2013.01); *H04L 7/033* (2013.01); *H04L 7/0331* (2013.01); *H04L 7/046* (2013.01)

(58) Field of Classification Search
CPC ..... H04L 7/0008; H04L 7/0331; H04L 7/046; H04L 7/033
See application file for complete search history.

(56) References Cited

U.S. PATENT DOCUMENTS

| | | |
|---|---|---|
| 4,189,622 A | 2/1980 | Foshee |
| 4,280,099 A | 7/1981 | Rattlingourd |
| 5,170,396 A | 12/1992 | Rivers et al. |
| 5,473,612 A | 12/1995 | Dehner, Jr. et al. |

(Continued)

OTHER PUBLICATIONS

"U.S. Appl. No. 15/045,826, Ex Parte Quayle Action mailed Sep. 15, 2016", 8 pgs.

(Continued)

*Primary Examiner* — Jean B Corrielus
(74) *Attorney, Agent, or Firm* — Schwegman Lundberg & Woessner, P.A.

(57) ABSTRACT

An apparatus comprising: a signal detection circuit determine a count reached by a counter between successive detected edge signals and to provide an indication of whether successive detected edge signals are separated from each other by at least a prescribed time interval; a clock circuit that produces clock signal pulses in response to a provided indication of an occurrence of a succession of detected edge signals each separated from a previous edge signal of the succession by at least the prescribed time interval; phase matching circuitry configured to align the produced clock signal pulses with detected edge signals; and a pattern matching circuit that that samples a sequence of detected edge signals aligned with the produced clock signal pulses to detect a data packet.

22 Claims, 11 Drawing Sheets

(56) References Cited

U.S. PATENT DOCUMENTS

| | | | |
|---|---|---|---|
| 5,491,713 A * | 2/1996 | Kwok | H04L 7/0331 |
| | | | 329/304 |
| 5,577,056 A | 11/1996 | Malik et al. | |
| 5,757,922 A | 5/1998 | Shiroshita | |
| 5,867,533 A * | 2/1999 | Fleek | H04L 27/2332 |
| | | | 370/445 |
| 6,363,107 B1 | 3/2002 | Scott | |
| 6,529,148 B1 * | 3/2003 | Maddux | H04L 7/0338 |
| | | | 341/100 |
| 6,901,116 B1 | 5/2005 | Pines et al. | |
| 7,103,116 B2 | 9/2006 | Thomson et al. | |
| 7,304,969 B2 | 12/2007 | Ryan et al. | |
| 7,369,485 B2 | 5/2008 | Halford et al. | |
| 7,412,235 B2 | 8/2008 | Larson et al. | |
| 7,636,404 B2 | 12/2009 | Guo et al. | |
| 8,149,965 B2 | 4/2012 | Sankabathula et al. | |
| 9,246,669 B2 | 1/2016 | Khan et al. | |
| 9,673,962 B1 | 6/2017 | Khan et al. | |
| 2001/0008550 A1 * | 7/2001 | Takahashi | H04J 3/0608 |
| | | | 375/368 |
| 2002/0075974 A1 | 6/2002 | Mill | |
| 2003/0128789 A1 | 7/2003 | Drerup et al. | |
| 2005/0105662 A1 * | 5/2005 | Margules | H03L 7/06 |
| | | | 375/376 |
| 2005/0190786 A1 * | 9/2005 | Jones, IV | H04L 1/0045 |
| | | | 370/465 |
| 2005/0286643 A1 | 12/2005 | Ozawa et al. | |
| 2007/0074086 A1 * | 3/2007 | Goth | H03L 7/089 |
| | | | 714/709 |
| 2011/0261969 A1 | 10/2011 | Elkhatib et al. | |
| 2013/0227381 A1 | 8/2013 | Akkarakaran et al. | |
| 2015/0270948 A1 | 9/2015 | Khan et al. | |
| 2015/0341161 A1 | 11/2015 | Khan et al. | |
| 2016/0006544 A1 | 1/2016 | Cowley et al. | |

OTHER PUBLICATIONS

"U.S. Appl. No. 15/045,826, Notice of Allowance dated Jan. 31, 2017", 8 pgs.

"U.S. Appl. No. 15/045,826, Response Filed Nov. 15, 2016 to Ex Parte Quayle Action mailed Sep. 15, 2016", 11 pgs.

U.S. Appl. No. 15/045,826 U.S. Pat. No. 9,673,962, filed Feb. 17, 2016, System and Method for Reducing False Preamble Detection in a Communication Receiver.

U.S. Appl. No. 14/218,697, filed Mar. 18, 2014, Systems and Method for Reducing False Preamble Detection in a Communication Receiver.

U.S. Appl. No. 14/285,415, filed May 22, 2014, Apparatus and Method for Modular Signal Acquisition and Detection.

"ADF7021-V High Performance, Narrow-Band Transceiver IC", Analog Devices Data Sheet, (2010-2014), 61 pages.

Application No. 17156381.0 (EPO), (Jun. 7, 2018), 7 pages.

* cited by examiner

SYSTEM AND METHOD FOR REDUCING FALSE PREAMBLE DETECTION IN A COMMUNICATION RECEIVER

CLAIM OF PRIORITY

This patent application is a continuation of and claims the benefit of priority to U.S. patent application Ser. No. 15/045,826, filed on Feb. 17, 2016 (now U.S. Pat. No. 9,673,962), which is hereby incorporated by reference herein in its entirety.

BACKGROUND

Electronic systems such as transceivers use dock and data recovery (CDR) circuits to acquire and track incoming signals. An incoming signal may include a preamble code that includes a relatively easily identifiable binary code sequence that precedes an information packet. More specifically, receipt of the preamble typically precedes receipt of a sync message that proceeds an information packet. In an electronic system that uses a packet based protocol, for example, each packet typically is preceded by a preamble that contains a sequence of binary logic values of a predetermined number which alternate at a predetermined clock interval.

Figure 1A:
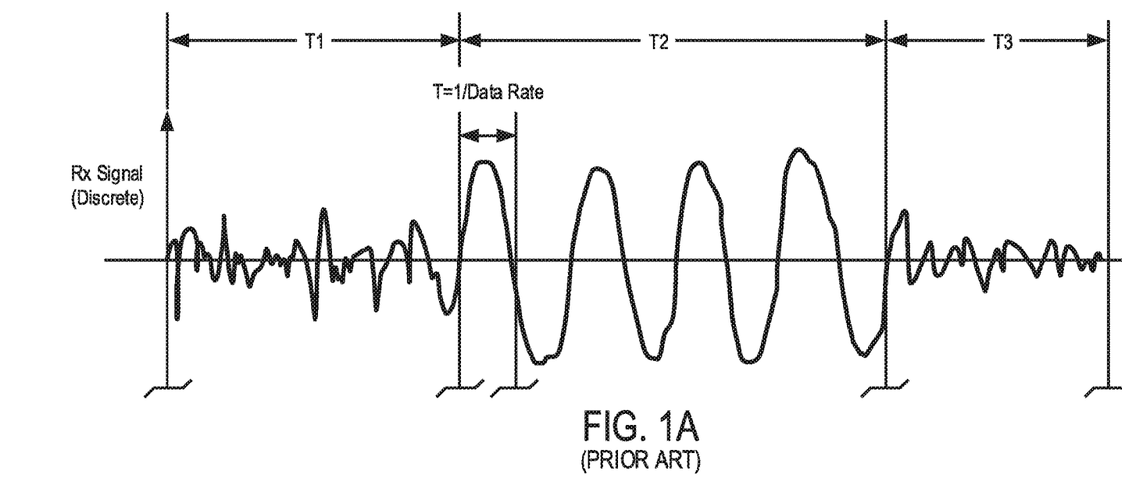
FIG. 1A is an illustrative example demodulated input signal timing diagram showing a portion of modulated information input signal and superimposed noise.
Figure 1B:
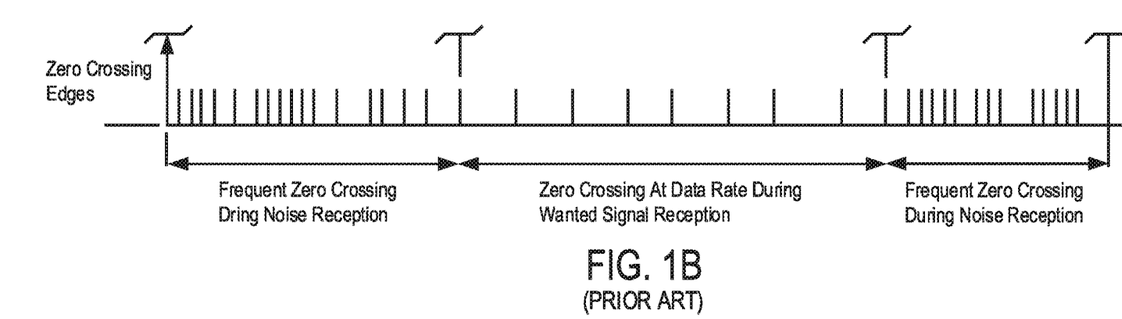
FIG. 1B is an illustrative example corresponding demodulated signal showing both zero crossing noise edges and zero crossing information input signal edges.

In a wireless communication system, a receiver receives RF information signal to convert it to a digital data stream. During receipt of an information signal, additive white Gaussian noise often superimposes upon the received signal and distorts it either in constructive or destructive fashion. FIG. 1A is an illustrative example demodulated input signal timing diagram showing a portion of modulated information input signal and superimposed noise. FIG. 1B is an illustrative example corresponding demodulated signal showing both zero crossing noise edges and zero crossing information input signal edges. During first and third time intervals, T1, T3, only noise is received. During a second time interval T2 a preamble portion of an information input signal having values 1, 0, 1, 0, 1, 0, 1, 0, is received amidst the noise.

At a reasonable received signal power level a preamble signal sequence within a received information signal has well defined zero crossing edges having time period equal to data rate of the receiver is configured to receive. The example received preamble like information signal has zero crossings that are spaced apart by 1/data rate, for example. A CDR circuit can exploit the zero crossing edges of an incoming preamble sequence to align a locally generated dock signal to the incoming packet data stream. Often, a CDR circuit uses an oversampled digital phase locked loop (DPLL) operated at a clock frequency much higher than a target data rate to detect preamble packet signal edges to detect the presence of an incoming packet. A clock and data recovery system may be configured to extract demodulated dock and data information from a data stream that is modulated by various schemes such as frequency shift keying (FSK) and to cause a numerically controlled oscillator (NCO) to generate a recovered clock.

In general, a receiver spends much of its time waiting to receive packet data. During that wait time, the receiver ordinarily receives random white Gaussian noise with zero mean. The received noise typically has far more frequent zero crossing edges at a demodulator output than does an information signal, and the time between consecutive noise edges is variable and random. However, noise can from time to time have characteristics of a preamble signal at a demodulator output, which can result in false packet data detection.

SUMMARY

An apparatus to detect a fake data packet comprises a signal detection circuit that includes a counter circuit configured to determine a count reached between successive detected edge signals and to provide an indication of whether successive detected edge signals are separated from each other by at least a prescribed time interval. A clock circuit produces clock signal pulses in response to a provided indication of an occurrence of a succession of detected edge signals each separated from a previous edge signal of the succession by at least the prescribed tune interval. Phase matching circuitry aligns the produced clock signal pulses with detected edge signals. A pattern matching circuit matches a sequence of detected edge signals aligned with the produced clock signal pulses to detect a data packet.

DESCRIPTION OF THE EMBODIMENTS

The following description is presented to enable any person skilled in the art to create and use an apparatus and method to reduce the occurrence of false preamble detection in a communication receiver. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings. Thus, the present invention is not intended to be limited to the embodiments shown, but is to be accorded the widest scope consistent with the principles and features disclosed herein.

Figure 2:
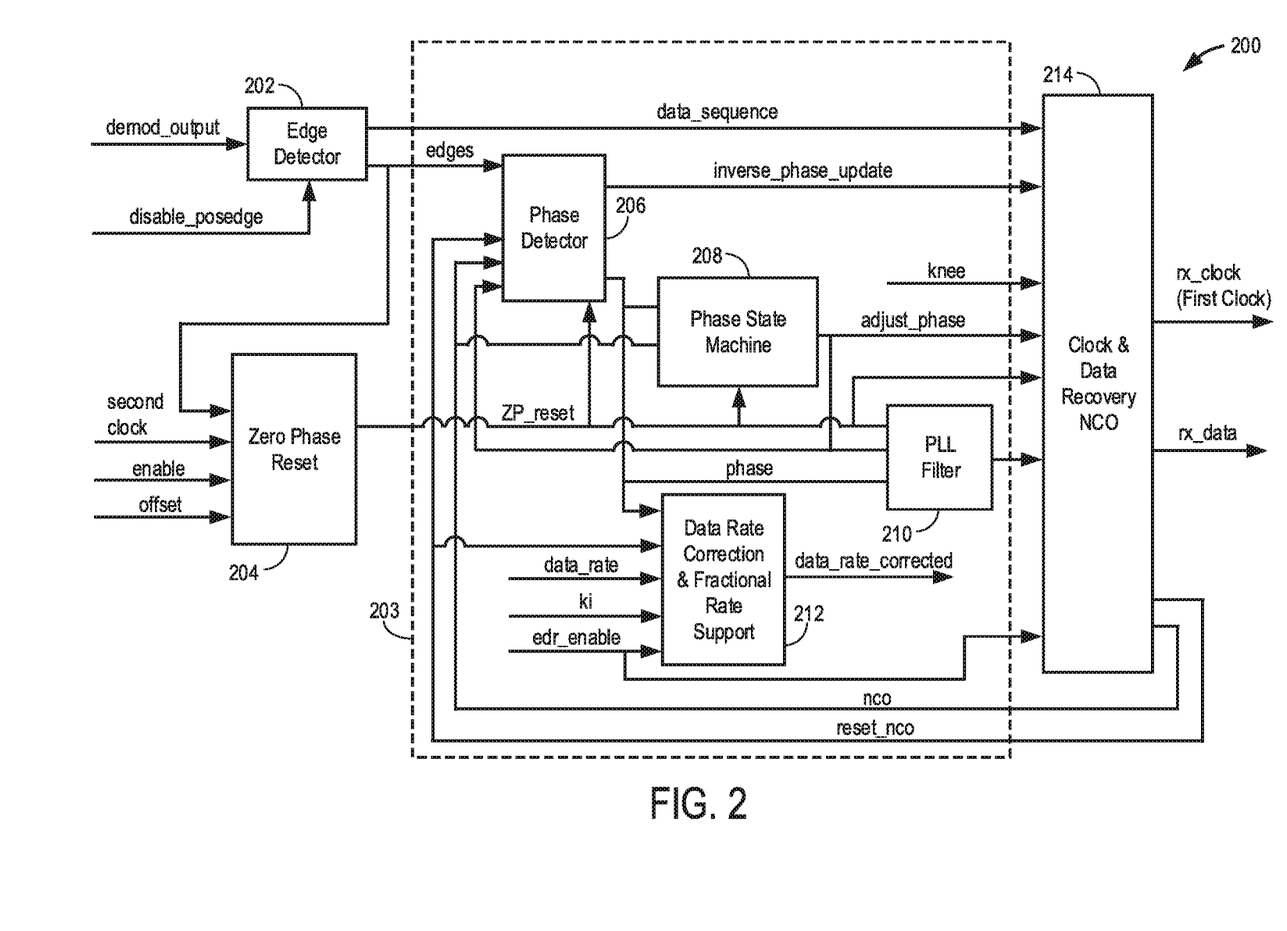
FIG. 2 is an illustrative block diagram of an example clock and data recovery system in accordance with some embodiments.

FIG. 2 is an illustrative schematic block diagram of an example clock and data recovery system 200 in accordance with some embodiments. The system 200 includes an edge detector 202, phase matching circuitry (indicated within dashed lines) 203 and a received signal detection circuit 204, also referred to herein as a "zero phase reset circuit" or "ZPS circuit". The phase matching circuitry 203 includes a phase detector 206, phase state machine 208, phase locked loop (PLL) filter 210, and a data rate correction and fractional rate support circuit 212 which are operatively coupled to a clock and data recovery (CDR) numerically controlled oscillator (NCO) 214. The system 200 may be implemented within systems such as a network device to acquire and track a data stream that is modulated by one of various modulation schemes. Example modulation schemes include 2-FSK, or binary FSK, 3-FSK, or ternary FSK, and 4-FSK depending on the number of digital levels represented in discrete frequencies. The system 100 also may have an internal or local clock, also referred to herein as a second clock, which is used to run each circuit block of the system 200. A local clock signal may have a rate higher than a target data rate of a received input signal. For example, the local clock rate may be 32 times higher than the target data rate of a received input signal. However, the local clock signal can have a rate that varies in a very broad range and other applicable rates can be used and will be readily determined by one of ordinary skill in the art.

The edge detector 202 receives a demodulated information input signal from a demodulator circuit (not shown). The edge detector 202 detects edges of the information signal. The edge detector circuit 202 can be implemented by, for example, exclusive-OR (XOR) gates and one or more delay circuits (not shown). The edge detector 202 generates an edge signal in response to detection of an occurrence of a demodulated input signal edge. In one example, when the edge detector 202 detects an edge of the demodulated input signal, the edge detector 202 can generate a pulse as will be described below with reference to FIG. 6. Edge detecting operations of the edge detector 202 may be selectively enabled or disabled and the edge detector 202 can be configured to detect either positive edges or negative edges, or both, of the demodulated input signal. For example, the edge detector 202 may receive a control signal that disables positive edge detection of the edge detector 202 triggering signal operations so as to configure the edge detector 202 to produce an edge signal only in response to detection of an occurrence of a negative edge. The edges signal from the edge detector 202 is provided as an input to the phase detector 206 and to the signal detection circuit (zero phase reset circuit) 204.

The edge detector 202 generates the edges signal as described above as the system 200 receives data, which can be accompanied by noise. For example, when an input terminal to the system 200 is disconnected or is not being driven by a received demodulated information input signal, the resulting noise can interfere with the acquisition of an information input signal when it eventually appears. Incoming data streams to the system 200 can be preceded and followed by random noise having Gaussian distribution with zero mean value. A data sequence can include a stream of symbols of unit intervals in duration, for example. The data sequence may be preceded by a specific preamble sequence that varies based on the modulation scheme of the data. For example, in some embodiments, a demodulated preamble sequence of +1, −1, +1, −1 . . . relative to the zero mean (which would be translated to the 2-FSK preamble sequence of 101010 . . . ) should have zero crossing transitions at approximately every 32 counts of the local clock signal when the local clock signal is set to about 32 times of the received input data rate. The preamble is detected to acquire phase lock to the input signal. However, noise that precedes the demodulated data sequence can have more frequent random zero crossing transitions compared to the data stream, and in response to the noise-related zero crossings, the edge detector 202 can generate an edges signal that includes more frequent unit pulses signaling zero-crossings while the system 200 receives noise as opposed to data.

The signal detection circuit 204 generates a reset signal that resets various modules of the illustrated system 200, including the phase detector 206, the phase state machine 208, the PLL filter 210, and the CDR NCO 214 while the illustrated system 100 is acquiring the input signal. After the input signal is acquired and is being tracked, the signal detection circuit 204 does not need to operate. In the illustrated embodiment, the zero phase reset circuit 204 receives, among others, the edges signal from the edge detector 202, a local clock signal, and an offset value. The signal detection circuit 204 utilizes the frequent zero-crossings due to noise to reset the CDR NCO 214, so as to reduce the impact of noise upon clock and data recovery. The signal detection circuit 204 includes an internal counter, referred to herein as the second counter, to count local clock cycles between the pulses of the edges signal and to cause a reset circuit to send a reset signal in response to the counter value not being within a given range as determined based at least partly upon the offset value.

Since the signal detection circuit 204 uses the frequency of zero-crossings of the incoming stream to operate, the signal detection circuit 204 can readily operate even when the input signal has a low amplitude that is close to or below the noise level. Moreover, zero crossings of a received input signal may occur at a known fixed rate given a specific modulation scheme preamble and the internal counter circuitry of the signal detection circuit 204 can be designed accordingly. For example, in some embodiments, a demodulated input signal for a 2-FSK preamble is +1, −1, +1, −1, . . . , and zero crossings for this signal are at approximately 32 counts of a local clock signal and the local clock signal is set at about 32 times the data rate. By resetting various modules in the system 200 when the system 200 receives noise with frequent zero-crossings, the system 200 can reduce the incidence of noise-induced false detections of a preamble signal and thereby achieve fast acquisition of the incoming signal with significantly improved acquisition time. The counting and reset functions of the zero phase reset signal are further described below with reference to FIGS. 3 and 6.

The phase detector 206 determines the phase of a received input data signal with respect to a first counter within the CDR NCO 214. The phase detector takes in, among others, the first counter value, the edge detect signal from the edge detector 202, an adjust phase signal from the phase state machine 208, and the reset signal from the signal detection circuit 204. The phase detector 206 generates, among others, a phase signal, which may be a positive or negative unit pulse. The phase signal indicates whether the phase difference between the first counter and the data signal is positive or negative. The phase signal from the phase detector 206 is fed to the phase state machine 208, the PLL filter 210, and the data rate correction and fractional rate support module 212.

The phase state machine circuit 208 can be a finite state machine that updates phase information. The phase state machine 208 takes in, among others, the phase signal and the first counter from the CDR NCO 214. The phase state machine 208 generates an adjust_phase signal based on the phase signal to control an NCO adjustment of the CDR NCO 214 base on the negative or positive sign of the phase signal. The phase state machine performs NCO adjustment at different positions within a bit interval for negative and positive phase update. For example, when the phase signal is positive and the first counter from the CDR NCO 214 is greater than a first predetermined value, the phase state machine 208 may generate the adjust_phase signal indicating a delay in phase update until the NCO is less than the first predetermined value. When the phase signal is negative and the first counter from the CDR NCO 214 is less than a second predetermined value, the phase state machine 208 may generate the adjust phase signal indicating a delay in phase update until the NCO is greater than the second predetermined value. As a result the rising edge of the rx_clock may move according to the NCO so as to not create a rising edge clock jitter as described in commonly assigned, co-pending U.S. patent application Ser. No. 14/218,697, filed Mar. 18, 2014 (now U.S. Pat. No. 9,553,717), entitled System and Method for Clock and Data Rate Recovery, which is expressly incorporated herein in its entirety by this reference. The adjust_phase signal from the phase state machine 208 is then fed to the phase detector 206, the PLL filter 210, and the CDR NCO 214.

The PLL filter 210 filters out unwanted frequencies while allowing wanted frequencies in the illustrated system 200. Depending on the input signal, characteristics of the system 200, and other possible internal or external disturbances, the PLL filter 210 may be configured to have specific gains for a range of frequencies, specific bandwidth to allow certain frequencies to pass while filtering out other frequencies, and/or specific desired timing responses for PLL functionality of the system 200.

The data rate correction and fractional rate support module 212 corrects programmed data rate according to an incoming data rate and also provides support for data rates differ from the programmed data rate by a fraction. The data rate correction and fractional rate support circuit 212 takes in, among others, the phase signal, gain parameters, such as ki and kp (not shown), and data rate value. Data rate can be adjusted based on accumulated phase error and through a control loop. Also, fractional data rate support can be achieved through accumulating fractions and alternating, or dithering, between two data rates. A data rate correction and fractional support circuit 212 in accordance with some embodiments is described in the above-identified co-pending U.S. Patent Application.

The CDR NCO 214 performs clock and data recovery based on the demodulated input signal received by the system 200. The CDR NCO 214 receives, among others, the data sequence, the adjust phase signal from the phase detector 206, and the reset signal from the signal detection circuit 204. The CDR NCO 214 generates an rx_clock signal, also referred to herein as a first clock signal, which is a recovered clock signal in sync with the data sequence, and an rx_data signal, which is a recovered data signal based on the data sequence. The rx_clock signal may be generated by creating a clock signal of 50% duty cycle based on an internal counter value of the CDR NCO 214. For example, the rx_clock signal may be set low for the first half of the CDR NCO counter period and high for the second half of the CDR NCO counter period. The internal counter of the CDR NCO 214 may be preprogrammed, reset, and/or adjusted according to the various embodiments described herein.

Figure 3:
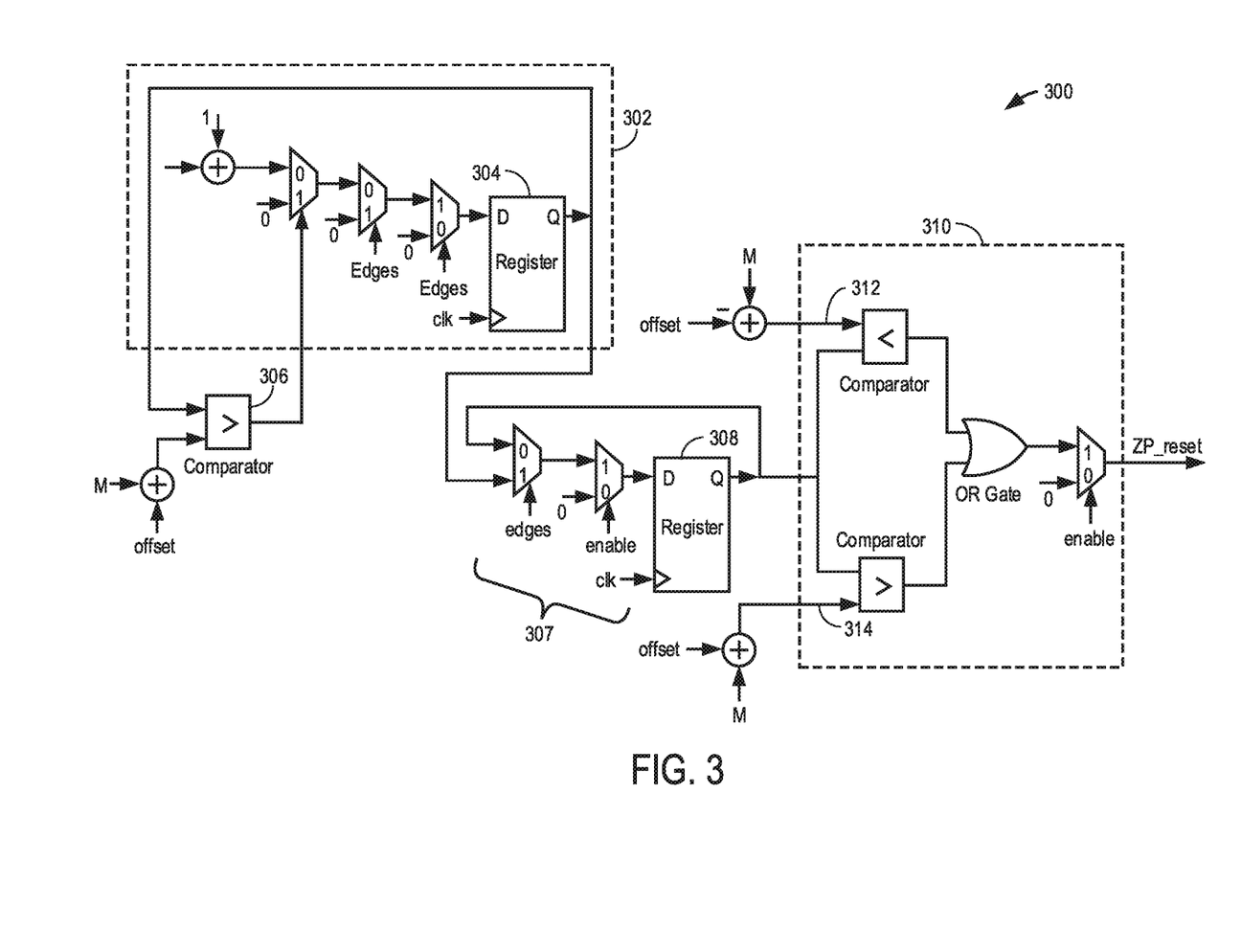
FIG. 3 is an illustrative circuit diagram of the zero phase reset circuit of FIG. 2 in accordance with some embodiments.

FIG. 3 is an illustrative circuit diagram of the signal detection circuit (zero phase reset circuit) 204 of FIG. 2 in accordance with some embodiments. The signal detection circuit 204 includes the second counter 302 and a window comparator 310. The second counter 302 may include multiple multiplexers to reset and/or enable the second counter 302, and a counter register 304 to hold clock count between two edges. The clock count is reset to zero in response the second counter 302 receiving a high or logic 1 from the edges signal, and the clock count value held at the counter register 304 will propagate to the next stage described below. Also, the signal detection circuit 304 includes a comparator 306 that compares the clock count value between two edges and the sum of a local clock multiplier and an offset, M+offset. The local clock multiplier, M, may be 32, for example, when the local clock is set at 32 times the data rate. Other multiplier values can be used. The offset may be a predetermined offset value such as 2 or 3 that may be the upper limit of the window comparator 310. After the clock count value reaches M+offset, the second counter 302 will be reset such that the clock count value will be back to zero.

Still referring to FIG. 3, a clock count value from the counter register 304 may further go through a maximum clock count holding stage that may include another set of multiplexers 307 to reset and/or enable the maximum clock count holding stage and a maximum count register 308. When the signal detection circuit 204 receives a high or logic one from the edges signal, the clock count value held at the counter register 304 will propagate to this stage 307, and the maximum count register 308 will hold the maximum value of the clock count from the counter 302 between the edges. The maximum value of the clock count then will be propagated to the window comparator 310.

Still referring to FIG. 3, the window comparator 310 may include an upper limit comparator 314, a lower limit comparator 312, an OR gate, and a multiplexer to enable the window comparator 310. The upper limit of the window comparator 310 may be set at an M+offset threshold and the lower limit of the window comparator 310 may be set at an M−offset threshold, where M may be the local clock multiplier and offset is the predetermined offset value described above. When the maximum clock count value is below M−offset or above M+offset the window comparator 310 will activate a zero phase reset signal to reset the modules described in FIG. 2. The foregoing logic is described with reference to "active high" logic such that a logic state is active or asserted when high or logic 1. Of course, in an alternative embodiment, active low logic can be used. When the maximum clock count value is between M−offset and M+offset, the window comparator 310 will not activate the zero phase reset signal and the modules described in FIG. 2 will not be reset.

Figure 4:
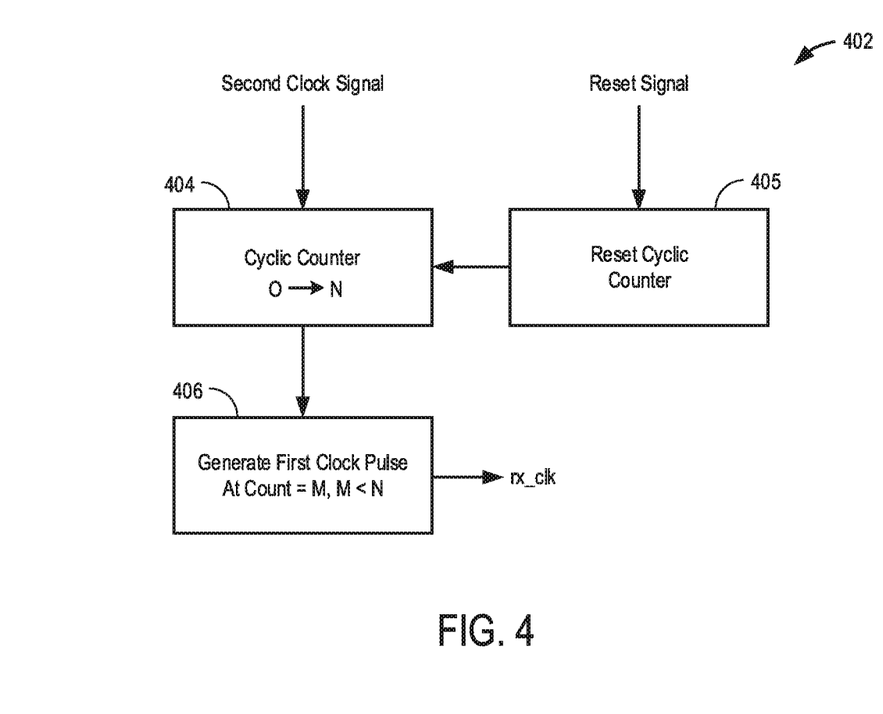
FIG. 4 is an illustrative block diagram representing a first clock within an NCO in accordance with some embodiments.

FIG. 4 is an illustrative block diagram representing the first clock 402 within the NCO 214 in accordance with some embodiments. A cyclic first counter 404 counts from a start value to a first count value N, and then repeats the count, in response to the second clock signal. A programmable clock pulse block 406 produces a clock pulse of the first clock signal rx_clk pulses in response to the first counter reaching a second count value M, that is less than or equal to first count value N (M<N). The value M is programmable. A reset block 405 resets the first counter to the start value in response to receipt from the signal detection circuit 204 of a reset signal having a prescribed value.

In some embodiments, for example, the maximum count of the cyclic first counter 404 is 32, and the first clock 402, therefore, has a clock frequency that is $\frac{1}{32}$ the second clock frequency. In some embodiments, each pulse of the first clock signal rx_clk pulse is generated by asserting rx_clk high for half of the counter value (max count to 32) running at 32×Data rate clock. This ensures that the rx_clk rising edges occurs in the middle location between two consecutive edges, hence the sampling point of the input signal happens at the middle of an eye diagram of the FSK signal.

In operation, the start of the incoming preamble signal relative to the first clock count is unknown, and therefore, a rising edge of the first clock signal rx_clk can occur anywhere in a received data bit period. Hence, there is a requirement to bring the cyclic first counter value either forward or backward in time to generate the rx_clk pulse early or late depending upon the count position of the first counter 404 relative to a received edge signals corresponding to a preamble signal. This adjustment value in the cyclic first counter 404 is a programmable option and it defines the CDR loop bandwidth of acquisition. It also signifies how fast or slow the CDR system 200 is programmed to acquire an incoming information signal. To achieve this adjustment or alignment the CDR circuit module 200 employs digitally controlled PLL operation described above to adjust the phase information of the first counter 404.

Figure 5:
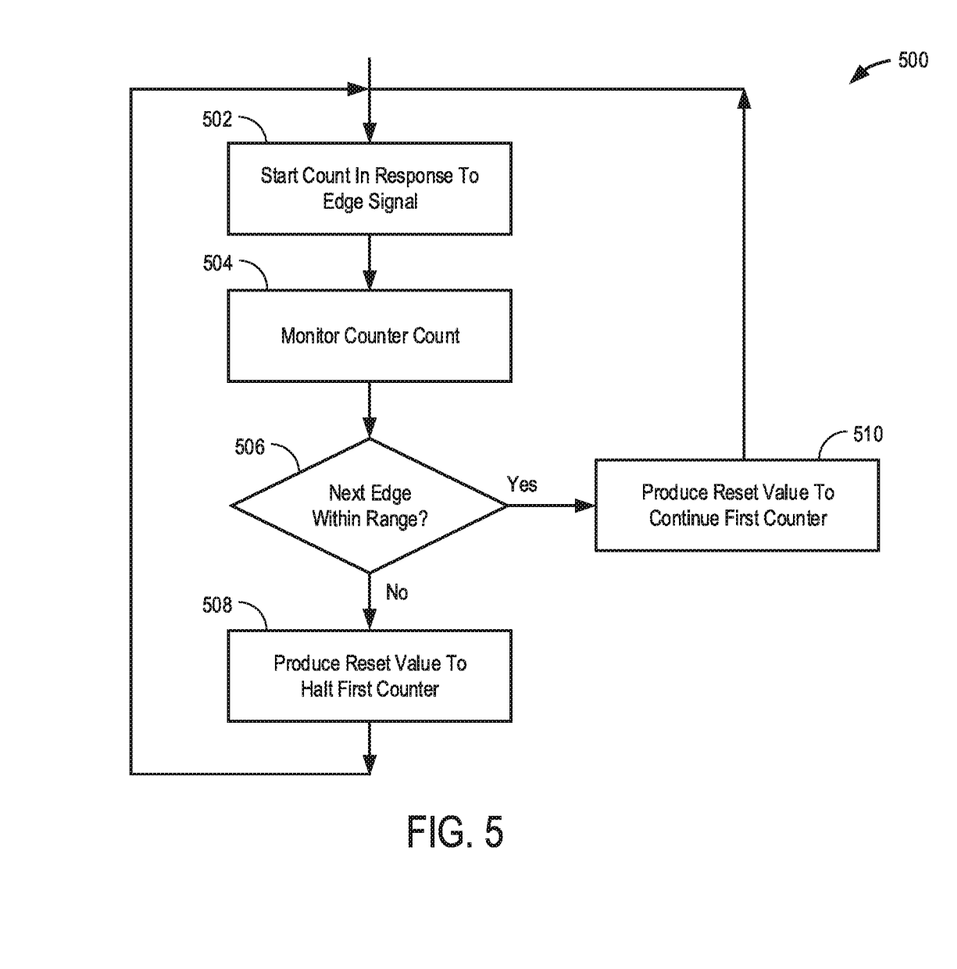
FIG. 5 is an illustrative flow diagram representing operation of the received signal detection circuit in accordance with some embodiments.

FIG. 5 is an illustrative flow diagram 500 representing operation of the signal detection 204 in accordance with some embodiments. Block 502 starts a count of a reset counter 503 in response to receipt of an edge signal from the edge detector 202. Block 504 monitors a reset count of the reset counter 503. Decision block 506, in response to receipt of a next edge signal, determines whether the reset count value of the reset counter 503 has reached a count that is within a prescribed range. In accordance with some embodiments, the prescribed range is between the M−offset threshold value and the M+offset threshold value as explained above. In response to a determination that the reset count value is not within the prescribed range, block 508 produces a first value for the reset signal 608 causing a reset of the first counter 604 during which time the first counter 604 halts its count, and control flows back to module 502. In response to a determination that the reset count value is within the prescribed range, block 508 produces a second value for the reset signal 608 causing the first counter 604 to cyclically count, and control flows back to module 502.

Figure 6:
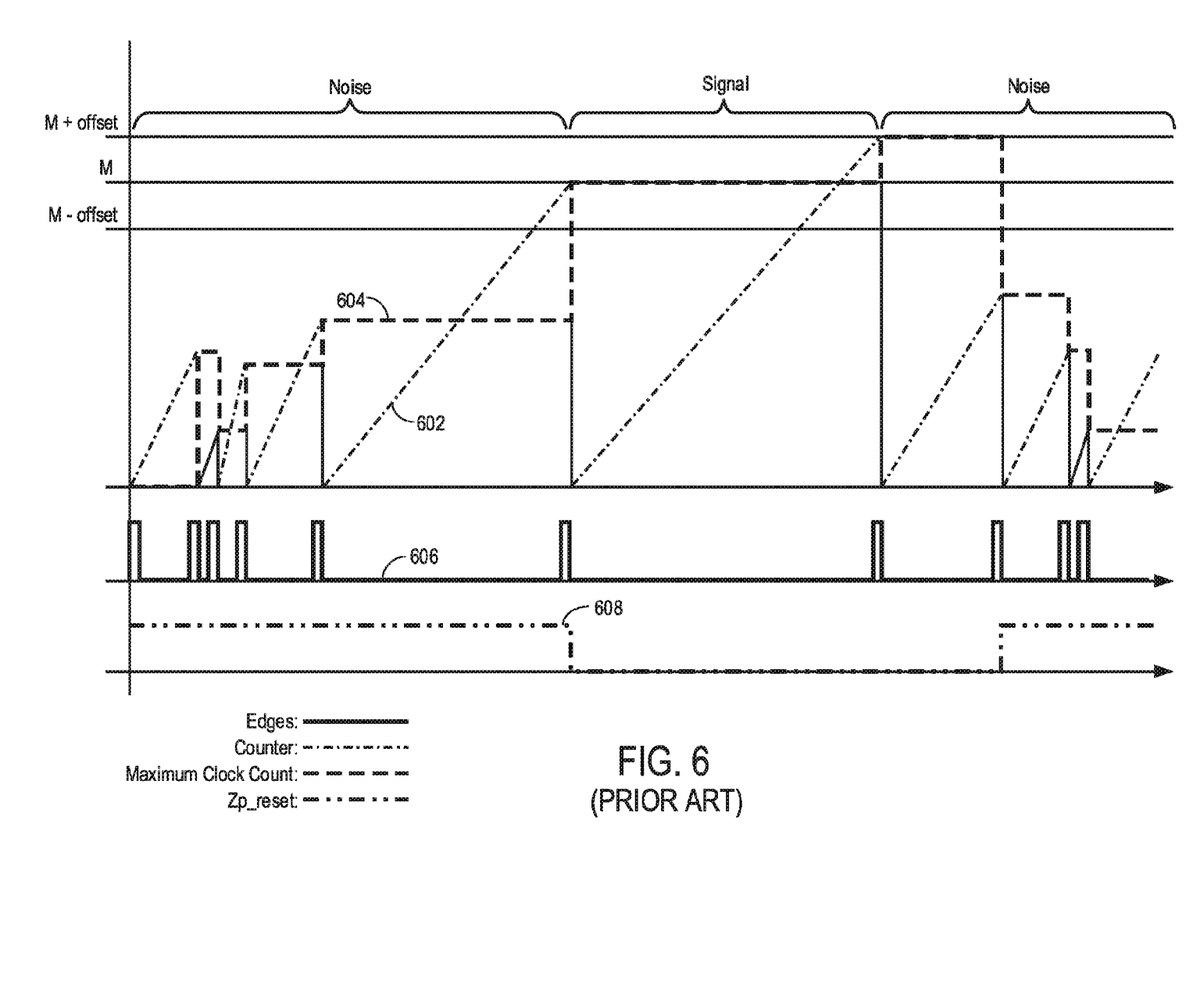
FIG. 6 is an illustrative a timing diagram showing operation of the zero phase reset circuit in accordance with some embodiments.

FIG. 6 is an illustrative a timing diagram showing operation of the signal detection circuit 204 in accordance with some embodiments. The timing diagram illustrates a waveform 602 corresponding to value of the second counter 302, a waveform 604 corresponding to an output of the maximum clock count register 308, a waveform 606 corresponding to the edges signal, and a waveform signal 608 corresponding to the resulting zero phase reset signal. The illustrated diagram in FIG. 6 shows that in accordance with some embodiments, the zero phase reset signal 608 is set at a first value during noise reception (i.e. when no information signal values are received and received edges represent noise), while the reset clock count value between two noise edges typically is outside (i.e. less than) a clock count window bounded by a clock count M+offset and a clock count M−offset. Conversely, in accordance with some embodiments, the zero phase reset value 608 is set at a second value during information signal reception, while the reset clock count value between two information signal edges falls within the clock count window bounded by a clock count M+offset and the clock count M−offset. In accordance with some embodiments, the first value is a logic high value, and the second value is a logic low value.

Figure 7:
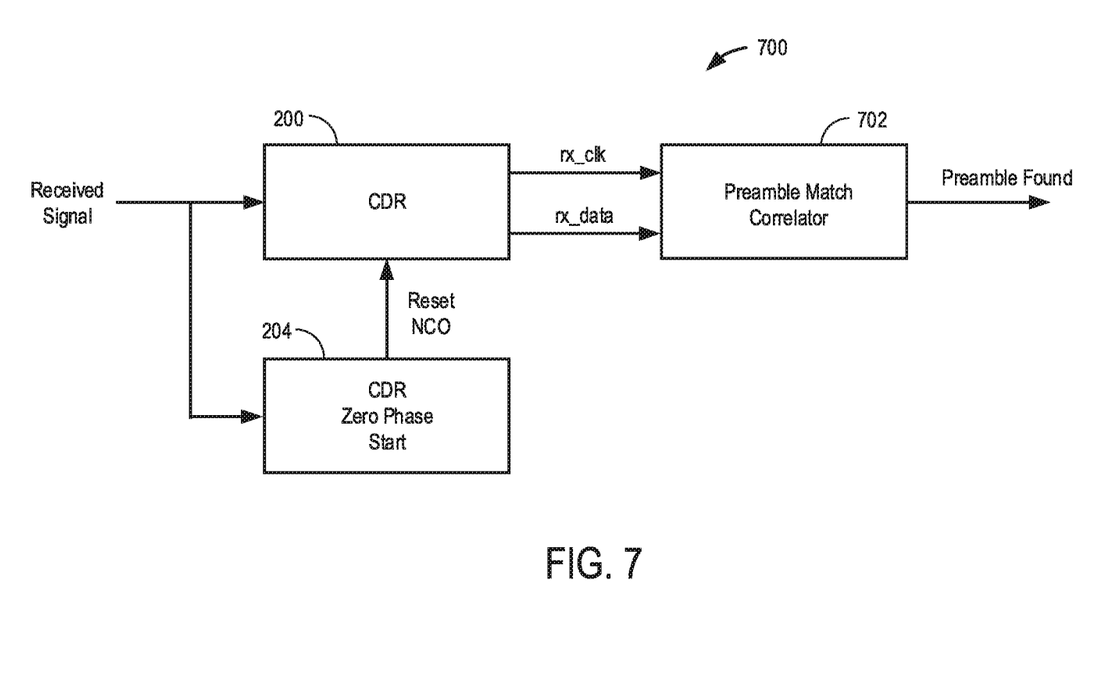
FIG. 7 is an illustrative block diagram of a first packet detection circuit in accordance with some embodiments.

FIG. 7 is an illustrative block diagram of a first packet detection circuit 700 in accordance with some embodiments. The first packet detection circuit 700 includes a CDR circuit 200, a ZPS circuit 204 and a preamble match correlator circuit 702. The CDR circuit 200 and the ZPS circuit 204 are operatively coupled as described with reference to FIG. 2. The ZPS circuit 204 is operatively coupled to provide a reset signal to the CDR circuit 200, and the CDR circuit operatively coupled to provide as its output, the rx_clk and rx_data signals. In accordance with some embodiments, a received input signal includes a sequence of input edge signals produced B by the edge detector circuit 202 described with reference to FIG. 2, based upon a demodulated input signal produced by a demodulator circuit (not shown). The preamble match detection circuit 702 is operatively coupled to receive the rx_clk and rx_data signals and to produce a preamble match output signal having a value indicative of whether the rx_data signal includes a sequence of binary values that match a preamble signal pattern.

Figure 8:
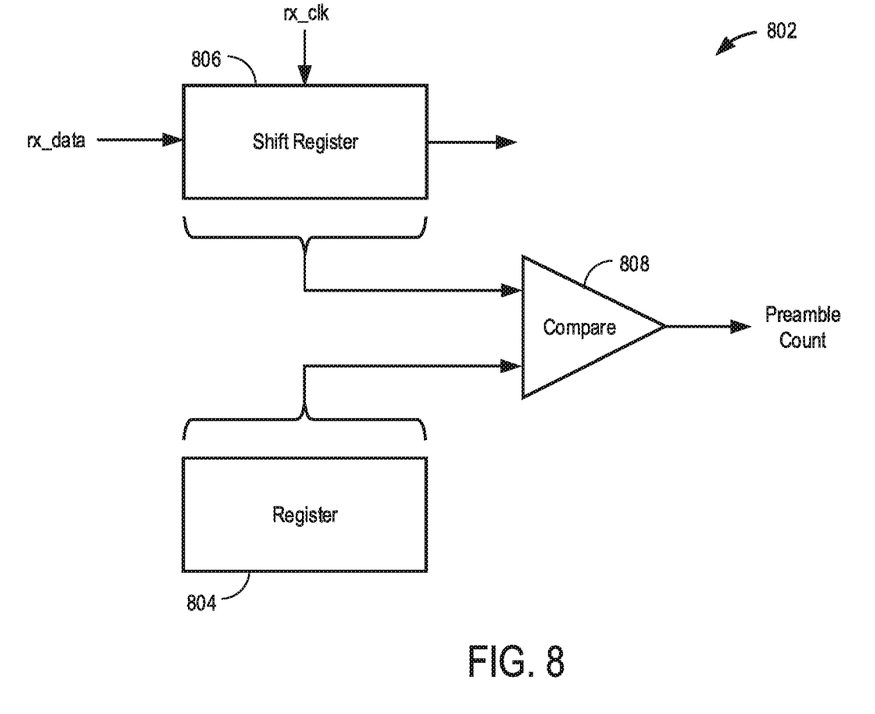
FIG. 8 is an illustrative schematic diagram showing additional details of the preamble match detection circuit in accordance with some embodiments.

FIG. 8 is an illustrative schematic diagram showing additional details of the preamble match detection circuit 702 in accordance with some embodiments. The preamble match circuit 702 includes a pattern storage register circuit 804, a shift register circuit 806 and a comparator circuit 808. The pattern storage register circuit 804 is configured to store an ordered collection of binary values that represent a prescribed preamble signal pattern. The shift register 806 is configured to input a received sequence of rx_data signal binary values in response to the first clock signal, rx_clk. In response to each received rx_clk signal pulse, the shift register 806 inputs a contemporaneously binary rx_data signal value. In some embodiments, the shift register has length n=8, and the each binary rx_data value input to the shift register 806 is shifted out in sequence after eight rx_clk cycles. The comparator circuit 806 is operatively coupled to, in response to each rx_clk signal pulse, compare the preamble pattern signal stored in the register 804 with the most recently received rx_data signal sequence to determine whether the multiple binary values in the register 804 match the multiple binary values currently stored in the shift register 806. In response to detection of a preamble match, the comparator circuit 806 produces a preamble match signal having a value indicative of the detection of the match. For example, in some embodiments, preamble match circuit 702 is configured to match an eight bit preamble pattern such as, 10101010.

Figure 9:
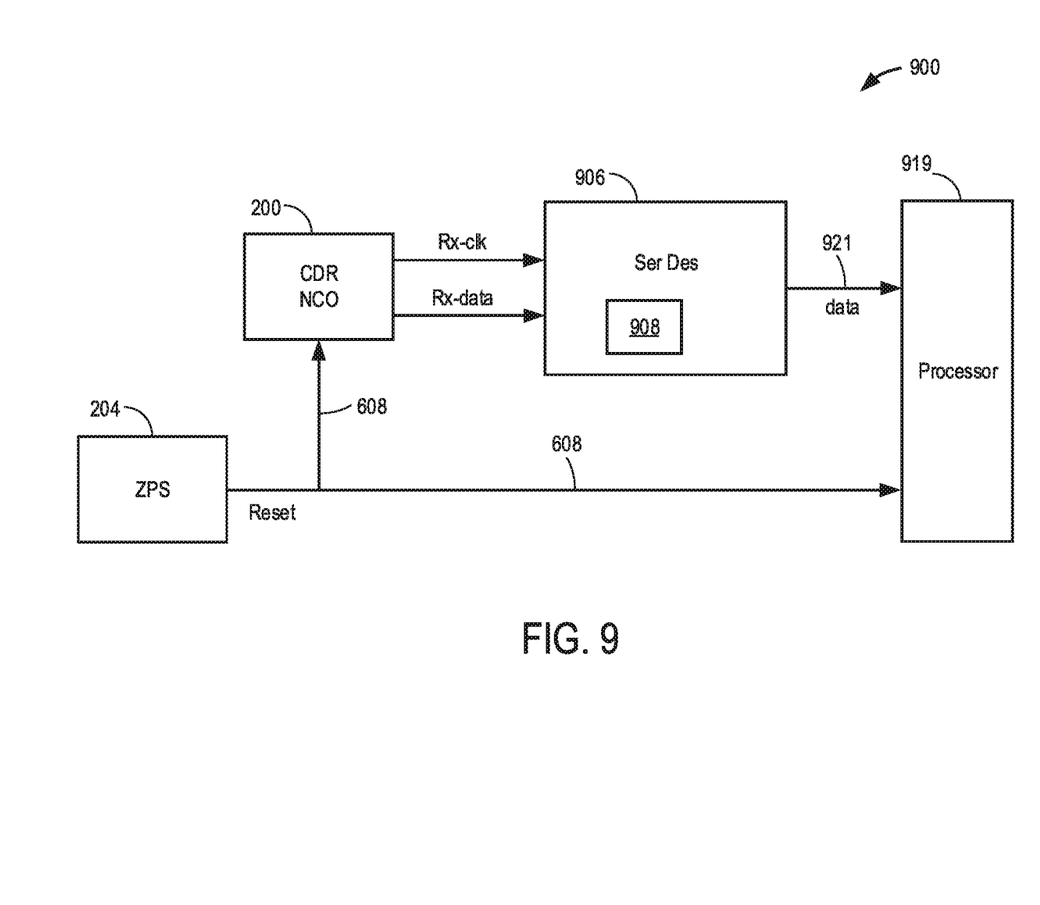
FIG. 9 is an illustrative block diagram of a second packet detection circuit in accordance with some embodiments.

FIG. 9 is an illustrative block diagram of a second packet detection circuit 900 in accordance with some embodiments. The second packet detection circuit 900 includes a CDR circuit 200, a ZPS circuit 204, a serializer/deserializer (Ser- Des) circuit 906, and a processor circuit 919. The SerDes circuit 906 acts as an interface circuit between the CDR circuit 200 and the processor circuit 919.

The CDR circuit 200 is operatively coupled to receive a received signal. The CDR circuit 200 provides serial rx_clk signals and serial rx_data signals to the SerDes circuit 906. The SerDes circuit 906 includes a preamble match detection circuit 908 to determine whether zero crossing transition patterns of received serial rx_data signals match a valid preamble sequence. During a time interval while packet payload information is received, the SerDes circuit 906 converts serial rx_clk signals and serial rx_data signals received from the CDR circuit 200 to parallelized data, and provides the parallel data to the processing circuit 919.

The processing circuit 919 is configured to perform processing functions on the received packet payload data such as protocol detection, address matching, address filtering, encryption whitening, and coding of parallel data path 921, for example. In some embodiments, the SerDes circuit 906 evaluates the received serial packet information to determine when the end of the packet has been received. For example, in some embodiments, the SerDes circuit 906 monitors CRC and other data patterns within a received packet information payload to identify the end of the packet.

The ZPS circuit 204 is operatively coupled to receive the received signal and to provide the reset signal 608, described above, to the CDR circuit 200. In response to the occurrence of edges produced by noise, the ZPS circuit 204 produces the reset signal 608 having the first value that resets CDR circuit 200. In response to the occurrence of edges produced by information signals, the ZPS circuit 204 produces a reset signal 608 having the second value that causes the CDR circuit 200 to produce serial rx_clk signals and serial rx_data signals.

During time intervals in between receipt of valid packets, the processor 919 operates in a low power, power saving mode. More particularly, while the ZPS circuit 204 produces the reset signal 608 having the first value, which indicates noise edges (rather than information signal edges), the processor 919 is powered down. However, in response to the ZPS circuit 204 producing the reset signal 608 having the second value, which indicates receipt of edge signals indicating receipt of an information signal (rather than noise), the processor 9191 powers up.

Figure 10:
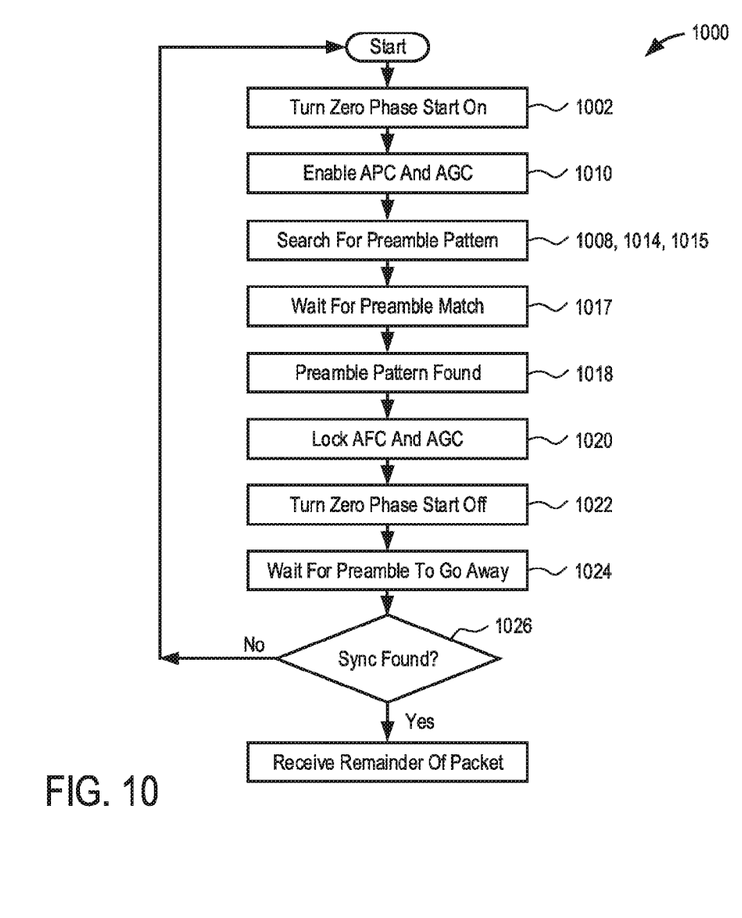
FIG. 10 is an illustrative flow diagram representing operation of the processor circuit of FIG. 9 in accordance with some embodiments.

FIG. 10 is an illustrative flow diagram 1000 representing operation of the processor circuit 919 of FIG. 9 in accordance with some embodiments. Functional blocks in FIG. 10 represent configuration of the processor 919 using hardware and/or computer program code to perform the indicated functions. Block 1002 transitions the processor 919 to a turn-on process in a powered up mode in response to receipt of the reset signal 608 having the second value indicating receipt of edge signal sequence for an information signal. In accordance with some embodiments, the processor 919 controls the power up other receiver circuit components (not shown) that are powered down while no packet is being received. For example, frequency error correction and gain control circuitry that may be turned off in order to save power while no packet is received, are turned on again to receive a new information packet. Block 1010 sets an automatic frequency control (AFC) acquire mode and sets an automatic gain control (AGC) free running mode to ensure that the receiver is not saturated and the gain is sufficiently high to acquire the input signal. Block 1014 searches for the preamble in the received digital signal values provided to the processor 919 by the SerDes circuit 906. Block 1017 locates the preamble pattern in the received digital signal values. Block 1018 locates the preamble pattern in the received digital signal values. Block 1020 locks AFC and AGC loops once the preamble is found. Block 1022 disables, i.e. turns off, the ZPS block 104. Block 1022 terminates the processor turn-on process in response to the AFC and AGC loops are locked and the preamble has been located. Block 1024 configures the SerDes 906 to wait for the preamble to complete. In accordance with some embodiments, the wait is 4-bits. Decision block 1026 determines whether a Sync pattern is detected following the preamble. In response to no detection of the Sync pattern, the processor issues a clearing interrupt and control flows back to start to await occurrence of receipt of the reset signal 608 having the second value. In response to detection of the Sync pattern, block 1028 receives and processes the packet payload data. The processor 919 powers down between receipt of packets.

Figure 11A:
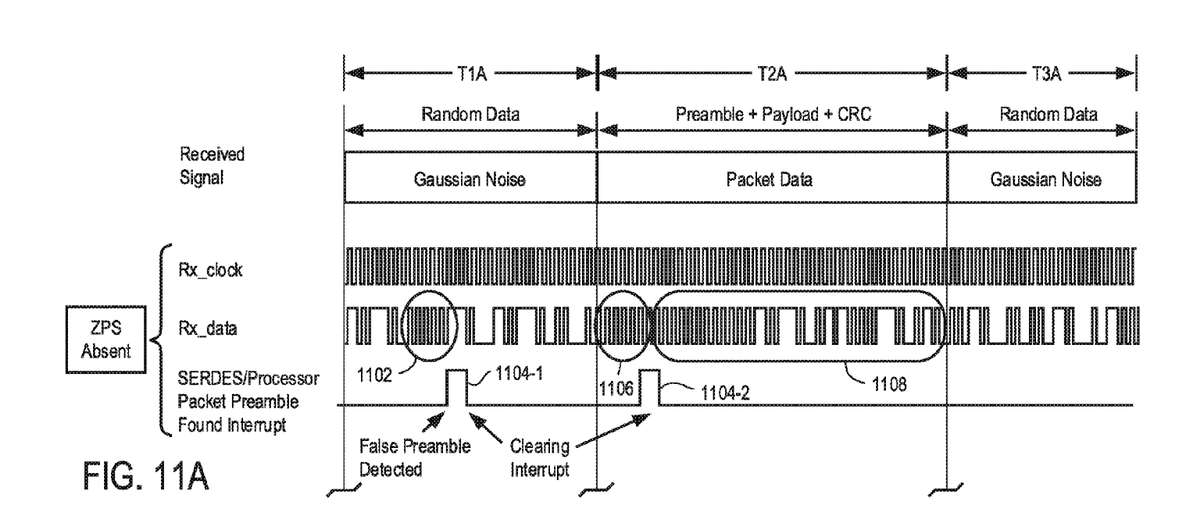
FIG. 11A is an illustrative timing diagram for an alternative embodiment of the second packet detection circuit in which the ZPS circuit is disabled so as to be inoperative during preamble search mode.
Figure 11B:
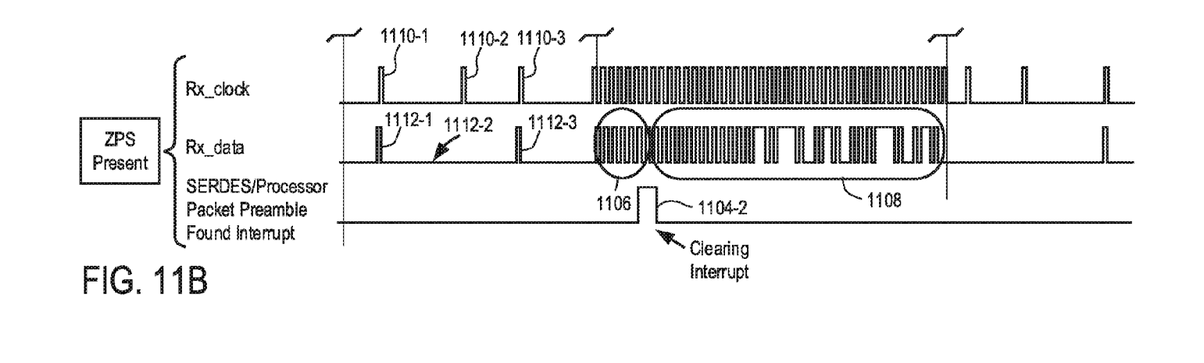
FIG. 11B there is shown an illustrative timing diagram for the second packet detection circuit in accordance with some embodiments.

FIGS. 11A-11B are illustrative signal timing diagrams that each illustrates signals during three different time intervals. A first time interval $T1_A$ occurs prior to arrival of an information packet while a demodulator output is noise. A second time interval $T2_A$ occurs during reception of the information packet while a demodulator output includes actual information such as preamble, sync, and packet payload data. A third time interval $T3_A$ occurs after the completion of the information packet while a demodulator output is noise. More specifically, during the first interval $T1_A$, the received input signal comprises random data having random zero crossings and characteristics of Gaussian noise. During the second time interval $T2_A$, the received input signal comprises packet data that includes a packet preamble, followed by packet payload, followed by CRC information. During the third time interval $T3_A$, the received input signal comprises random data having random zero crossings and characteristics of Gaussian noise.

FIG. 11A is an illustrative timing diagram, which illustrates some problems that can arise in a variation (not shown) of the embodiment 900 of FIG. 9 that lacks a ZPS circuit. Still referring to FIG. 11A, during the first and third time intervals $T1_A$, $T3_A$, while random data having Gaussian noise characteristics is received, in the absence of a ZPS circuit 204, the rx_clk runs continuously, resulting in continuous periodic sampling of the received random data. In response, the CDR circuit 200 produces a corresponding random rx_data sequence, which is provided to the SerDes circuit 906. Due to the Gaussian characteristics of the random data, from time to time, the random rx_data sequence may include a bit sequence pattern that matches a predetermined preamble sequence. For example, in the illustrative random rx_data sequence, the rx_data portion 210202 during the first time interval includes a preamble sequence 10101010, which in this example, is assumed to match a preconfigured preamble sequence. The SerDes circuit 906, which is receiving the rx_data signal, detects the preamble match. In response to detecting the preamble match, the processor 919 issues a clearing interrupt signal 210204-1 that results in its halting the search for a preamble match and initiating a wait for receipt of an rx_data sequence that includes a Sync signal. However, no Sync signal arrives since the detected preamble sequence is a false detection since it is the result of random data and not in response to arrival of an actual information packet. After the wait period, the SerDes circuit 906 resumes its search for a preamble match. Unfortunately, if an actual information packet arrived while the SerDes circuit 906 is awaiting the arrival of a Sync signal, then that next arriving packet would be missed.

Still referring to FIG. 11A, during the second time interval TIA, while packet data is received, the rx_clk signal runs continuously, and a true preamble signal sequence 210206 is received. The SerDes circuit 906 detects the occurrence of the preamble sequence and issues a clearing interrupt 210204-2. This time, a proper Sync sequence is received, since the preamble sequence is part of an actual information packet that precedes an actual packet payload, and the remainder of the packet data 210208 is received. One or more additional packet processing blocks (not shown) may be involved in processing the packet data 908, for example.

Referring now to FIG. 11B, there is shown an illustrative timing diagram for the second packet detection circuit 900, which includes the ZPS circuit 204 in accordance with some embodiments. The ZPS circuit 204 is enabled during the first, second and third time intervals. As a result, the CDR, circuit 200 is reset whenever two received input signal edges occur that are temporally separated by a time interval that is less than a prescribed time interval. Due to the typically high rate of zero crossing of received random data having a Gaussian noise characteristic, the ZPS circuit 204 resets the CDR circuit 100 at a high rate. As a result, the CDR circuit 200 produces a sparse sequence of random rx_clk pulses. Since rx_data is sampled upon the occurrence of a contemporaneous rx_clk pulse, a corresponding sparse sequence of random rx_data is produced. Thus, during the first and third time intervals when random data is received, with the ZPS circuit 204 enabled, the CDR circuit 200 produces a sparse sequence of random rx_clk pulses and a corresponding sparse sequence of random rx_data values. In particular, for example, during the first time interval, a first random rx_clk pulse 1210-1 corresponds to a first random rx_data value 1212-1 (binary value=1); a second random rx_clk pulse 1210-2 corresponds to a second random rx_data value 1212-2 (binary value=0), and a third random rx_clk pulse 1210-3 corresponds to a third random rx_data value 1212-3 (binary value=1). The random rx_clk signals are generally temporally spaced apart by an amount that is large relative to temporal spacing of a normal clock rate rx_clk signal pulses during receipt of an actual information packet. It will be appreciated that the larger temporal spacing apart of the random rx_clk signal pulses during random data occurrences results in a lower rate of occurrence of false preamble matches since the reduced number of random rx_clk pulses results in the SerDes circuit 906 detecting a reduced number of random rx_data signal samples, which could contribute to possible false preamble matches.

Still referring to FIG. 11B, the rx_clk signal sequence and the rx_data sequence and the clearing pulse that occur during the second time interval T2$_A$, while an actual information packet is received, are identical to those occurring during the second time interval of FIG. 11A, and therefore, these signals will not be explained further herein. Signal patterns in the third time interval T3$_A$ in FIGS. 11A-11B will be readily understood from the above description and will not be explained further herein.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A packet detection circuit comprising:
   packet preamble detection circuit to indicate detection of a packet preamble based upon a succession of detected edge signals, each separated from an adjacent edge signal by at least a prescribed time interval, matching a prescribed preamble pattern; and
   clearing circuitry to produce a signal to indicate false preamble detection in response to failure to receive packet information following an indication of an arrival of a packet preamble.

2. The packet detection circuit of claim 1,
   wherein the packet preamble detection circuit includes,
   a counter circuit configured to provide an indication of whether successive detected edge signals are separated from each other by at least a prescribed count; and
   a pattern matching circuit, coupled to the counter circuit, configured to match a sequence of detected edge signals, separated from each other by at least the prescribed time interval, with the prescribed pattern.

3. The packet detection circuit of claim 2,
   wherein the pattern matching circuit includes,
   a register configured to hold a sequence of detected edge signals separated from each other by at least the prescribed time interval; and
   a comparator configured to compare the sequence of detected edge signals, separated from each other by at least a prescribed time interval, with the prescribed pattern.

4. The packet detection circuit of claim 2,
   wherein the pattern matching circuit includes,
   a clock circuit that produces clock signal pulses in response to the provided indication indicating successive detected edge signals are separated from each other by at least the prescribed time interval.

5. The packet detection circuit of claim 2,
   wherein the pattern matching circuit includes,
   a clock circuit that produces clock signal pulses in response to the provided indication indicating successive detected edge signals are separated from each other by at least the prescribed time interval; and
   phase matching circuitry configured to align the produced clock signal pulses with detected edge signals.

6. The packet detection circuit of claim 5,
   wherein the phase matching circuitry includes,
   phase matching circuitry including a phase locked loop filter (PLL) coupled to receive a phase signal and to produce a PLL signal; and
   a phase detector coupled to receive the edge detection signals, the clock signal pulses and the PLL signal and to produce the phase signal.

7. The packet detection circuit of claim 1,
   wherein the clearing circuitry includes,
   a logic processing circuit to provide the signal to indicate false preamble detection in response to failure to receive the packet information following the pattern matching circuit detecting a packet preamble.

8. The packet detection circuit of claim 1,
   wherein the packet information includes a sync signal.

9. The packet detection circuit of claim 1,
   wherein the clearing circuitry includes,
   a logic processing circuit to power up in response to the pattern matching circuit indicating a match of a sequence of detected edge signals, separated from each other by at least the prescribed time interval, with the prescribed pattern;
   wherein the logic processing circuit to provide signal to indicate false preamble detection in response to failure to receive the packet information following the pattern matching circuit detecting a packet preamble.

10. The packet detection circuit of claim 1, further comprising circuitry configured to:
    set at least one of an automatic frequency control (AFC) or an automatic gain control (AGC) in a free running mode; and
    lock at least one of the AFC or AGC in response to detection of the packet preamble.

11. A packet detection circuit comprising:
    a counter circuit configured to provide an indication of whether successive detected edge signals are separated from each other by at least a prescribed count;
    a pattern matching circuit, coupled to the counter circuit, configured to match a sequence of detected edge signals, separated from each other by at least a prescribed time interval, with the prescribed pattern; and
    a logic processing circuit to indicate false preamble detection in response to failure to receive the packet information following the pattern matching circuit detecting a packet preamble.

12. A packet detection method comprising:
    providing a signal to indicate detection of a packet preamble based upon a succession of detected edge signals, each separated from an adjacent edge signal by at least a prescribed time interval, matching a prescribed preamble pattern; and
    producing a signal to indicate false preamble detection in response to failure to receive packet information following an indication of an arrival of a packet preamble.

13. The packet detection method of claim 12 further including:
    cyclically counting clock counts between successive detected edge signals to determine whether they are separated from each other by at least a prescribed count.

14. The packet detection method of claim 12 further including:
    cyclically counting clock counts between successive detected edge signals to determine whether they are separated from each other by at least a prescribed count; and
    matching a sequence of detected edge signals, separated from each other by at least the prescribed time interval, with the prescribed pattern.

15. The packet detection method of claim 12 further including:
    producing clock signal pulses in response to a provided indication indicating successive detected edge signals separated from each other by at least the prescribed time interval; and
    phase matching to align the produced clock signal pulses with detected edge signals.

16. The packet detection method of claim 12,
    wherein producing a signal to indicate false preamble detection includes powering up a logic processing circuit in response to an indication of a pattern match of a sequence of detected edge signals, separated from each other by at least the prescribed time interval, with the prescribed pattern.

17. The packet detection method of claim 12,
    wherein producing a signal to indicate false preamble detection includes producing a clearing interrupt signal.

18. The packet detection method of claim 12,
    wherein the packet information includes a sync signal.

19. The packet detection method of claim 12 further including:
    cyclically counting clock counts between successive detected edge signals; and
    comparing the count reached between two successive detected edge signals with a threshold value.

20. The packet detection method of claim 12 further including:
    cyclically counting clock counts between successive detected edge signals;
    comparing the count reached between two successive detected edge signals with a threshold value matching the prescribed time interval;
    producing clock signal pulses in response to a provided indication indicating successive detected edge signals separated from each other by at least the prescribed time interval; and
    phase matching to align the produced clock signal pulses with detected edge signals.

21. The packet detection method of claim 12 further including:
    setting at least one of an automatic frequency control (AFC) or an automatic gain control (AGC) in a free running mode; and
    locking at least one of the AFC or AGC in response to detection of the packet preamble.

22. A packet detection method comprising:
    cyclically counting clock counts between successive detected edge signals;
    comparing the count reached between two of the successive detected edge signals with a threshold value matching a prescribed count;
    producing clock signal pulses in response to a provided indication indicating that the two of the successive detected edge signals a separated from each other by at least the prescribed count;
    phase matching to align the produced clock signal pulses with one of the successive detected edge signals; and
    producing a signal to indicate false preamble detection in response to failure to receive packet information following an indication of an arrival of a packet preamble.

* * * * *

UNITED STATES PATENT AND TRADEMARK OFFICE
CERTIFICATE OF CORRECTION

PATENT NO. : 10,129,011 B2
APPLICATION NO. : 15/605082
DATED : November 13, 2018
INVENTOR(S) : Khan et al.

It is certified that error appears in the above-identified patent and that said Letters Patent is hereby corrected as shown below:

On the Title Page

In item (57), in "Abstract", in Column 2, Line 8, after "signals", insert --,--

In item (57), in "Abstract", in Column 2, Line 12, delete "that that" and insert --that-- therefor On page 2, in Column 2, under "Other Publications", Lines 8-10, delete "Systems and Method for Reducing False Preamble Detection in a Communication Receiver." and insert --Systems and Method for Clock and Data Recovery.-- therefor In the Claims In Column 13, Line 49, in Claim 15, after "signals", insert --,--

In Column 14, Line 26, in Claim 20, after "signals", insert --,--

In Column 14, Line 45, in Claim 22, after "signals", insert --,--

In Column 14, Line 45, in Claim 22, delete "a" and insert --are-- therefor

Signed and Sealed this
Twenty-fourth Day of March, 2020

Andrei Iancu
*Director of the United States Patent and Trademark Office*